тА#

2,956,952

LUBRICATING OIL COMPOSITIONS CONTAINING POLYMERS OF BIS-(BETA CHLOROETHYL) VINYL PHOSPHONATE

William P. FitzGerald, Florham Park, Anthony H. Gleason, Westfield, Arnold J. Morway, Clark, and Alfred H. Matuszak, Westfield, N.J., assignors to Esso Research and Engineering Company, a corporation of Delaware No Drawing. Filed Aug. 8, 1955, Ser. No. 527,174

7 Claims. (Cl. 252—49.9)

This invention relates to polymeric materials and more particularly relates to polymers and copolymers of bis-(beta chloroethyl) vinyl phosphonate, especially copolymers of ethylene and bis-(beta chloroethyl) vinyl phosphonate. The invention also relates to methods of preparing such polymeric materials and to the uses of such compounds, particularly as lubricant additives.

The polymeric materials of the present invention comprise as a monomer bis-(beta chloroethyl) vinyl phosphonate which has the following structural formula:

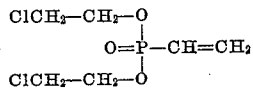

It has been found that this phosphonate may be polymerized by heating the monomer at elevated pressures employing a peroxide catalyst. It has also been found that this monomer may be copolymerized with other unsaturated organic compounds to prepare copolymers by carrying out the polymerization at elevated temperatures and pressures employing peroxide catalysts. It has further been found that either the phosphonate polymer, phosphonate copolymer or mixtures thereof are very effective extreme pressure or load-carrying agents for lubricants, particularly mineral and synthetic lubricating oil compositions.

The phosphonate polymers are prepared by heating bis-(beta chloroethyl) vinyl phosphonate at a temperature in the range of about 90° C. to 185° C., preferably about 110° C. to 160° C., employing pressures of about 100 to 10,000 p.s.i., preferably about 250 to 2500 p.s.i. The polymerization is catalyzed by any of the well-known peroxide polymerization catalysts. Specific examples of such peroxide catalysts include benzoyl peroxide, cumene hydroperoxide, tertiary butyl hydroperoxide, ditertiary butyl peroxide, 2,2-bis-(tertiary butyl) peroxy butane, acetyl peroxide, acetyl benzoyl peroxide, lauroyl peroxide, oleyl peroxide, etc., the persulfates such as the alkali persulfates (e.g. sodium, potassium, etc.), ammonium persulfate, hydrogen peroxide. The preferred catalysts are organic peroxides or hydroperoxides having the formula

where R is an alkyl or acyl radical and R' is a hydrogen atom, an alkyl radical or an acyl radical. The alkyl and acyl radicals preferably contain about 4 to 10 carbon atoms. Generally from about 0.01 to 2.0% by weight, based on the monomers, will be employed. Lesser or greater proportions may be employed if desired.

Generally it is desired that the polymerization reaction temperature be equal to or in excess of the thermal decomposition temperature of the specific peroxide catalyst being used. This polymerization reaction may be carried out either on a batch or a continuous basis as desired. Generally the reaction will be carried out for a period of time in the range of about 1 to 16 hours, preferably about 2 to 4 hours. By employing the above reaction conditions, phosphonate polymers having molecular weights in the range of about 1,000 to 3,500 or higher, preferably about 1,200 to 3,000 may be prepared. If desired, the polymerization reaction may be carried out in the presence of an inert diluent or solvent such as, for example, highly refined mineral oils (e.g. white oils), xylene, cyclohexane, etc.

Copolymers of bis-(beta chloroethyl) vinyl phosphonate may be prepared employing generally the same reaction conditions as those set forth above for the phosphonate polymers. The phosphonate monomer may be copolymerized with the following monomers: ethylene, propylene, isobutylene, styrene, a-methylacrylamide, acrylamide, a-methylacrylonitrile, acrylonitrile, isobutyl a-methacrylate, isobutylacrylate, n-butyl a-methylacrylate, n-butylacrylate, isopropyl a-methylacrylate, isopropylacrylate, n-propyl a-methylacrylate, n-propyl acrylate, ethyl a-methylacrylate, ethyl acrylate, methyl a-methylacrylate, methyl acrylate, a-methylacrylic acid, acrylic acid, vinylidene chloride, vinyl chloride, vinyl propionate, vinyl acetate, etc. The preferred monomers which are copolymerized with the phosphonate monomers are alkenes containing about 2 to 8 carbon atoms, such as, for example, ethylene, propylene, butylene, isobutylene, amylene, isoamylenes, hexene, isohexenes, heptene, isoheptenes, octene and isooctenes. The preferred alkene is ethylene. However, the higher molecular weight alkenes have the advantage that the copolymerization may be carried out at relatively lower pressures, frequently at the vapor pressure of the alkene at the particular reaction temperature being employed.

Generally the preferred copolymers have constituent monomers consisting of an alkene (containing about 2 to 8 carbon atoms, preferably ethylene) and bis-(beta chloroethyl) vinyl phosphonate in the mole ratio of about 10:1 to 100:1, preferably about 20:1 to 60:1. It will be understood, of course, that copolymers having a mole ratio (alkene to phosphonate) of less than about 10:1 may be prepared, that is, copolymers having properties approaching those of the phosphonate homopolymers. By employing the aforementioned reaction conditions, copolymers having molecular weights generally of about 500 to 5,000, and preferably about 600 to 3,000, may be prepared.

It will be understood that mixtures of monomers such as ethylene and propylene may be copolymerized with the phosphonate monomer. If desired, the copolymerization reaction may be carried out using an inert diluent or solvent such as those previously described for preparing the homopolymers. The tendency of the phosphonate to form homopolymers in the copolymerization reaction is reduced by employing relatively high pressures and relatively high concentrations of the other monomer, e.g., ethylene. The reaction conditions (particularly the pressures and proportions of monomers) in carrying out the copolymerization reaction may be controlled so as to produce a mixture of an essentially pure phosphonate polymer and a copolymer of the phosphonate and the other monomer, e.g., ethylene. Generally these mixtures may be promoted by the use of relatively low pressures, e.g., 100 to 2,000 p.s.i. Under controlled reaction conditions, a solid phosphonate polymer as well as a liquid or semi-liquid copolymer of the phosphonate and ethylene may be prepared in a simultaneous reaction. In this case, the phosphonate polymer and the phosphonate-ethylene copolymer may be separately recovered and employed individually as useful lubricating oil additives. However, if desired, the polymer-copolymer mixture may also be employed as a lubricating oil additive.

The bis-(beta chloroethyl) vinyl phosphonate which is employed as a monomer in the present invention may be prepared by initially reacting chloroethanol and $P_2O_3$ in accordance with the following equation:

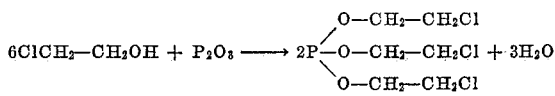

This reaction may be conveniently carried out at a temperature of about 100° to 500° F. The resultant tri-(chloroethyl) phosphite may then be reacted with a vinyl halide in accordance with the following chemical equation:

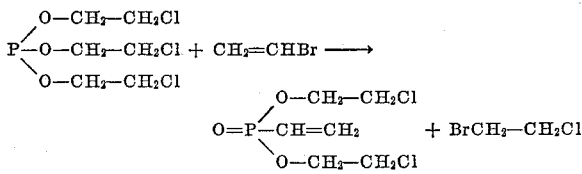

This reaction may be conveniently carried out at a temperature in the range of about 100° to 300° F. The bis-(beta chloroethyl) vinyl phosphonate may also be prepared by reacting a vinyl halide with an alkali metal salt of a di-(chloroethyl) acid phosphite. Preferred halides are those of bromine and chlorine and preferred alkali metals are sodium and potassium.

The polymeric materials of this invention comprising bis-(beta chloroethyl) vinyl phosphonate as a monomer are very effective as extreme pressure or load-carrying agents in lubricants such as greases and lubricating oil compositions containing mineral oil and synthetic oil base stocks. More specifically, the present polymeric materials can be employed in cutting oils, transmission and gear lubricants and can be blended directly into solid soap thickened greases to impart extreme pressure properties. In this latter application, complete solubility in oil is not a necessary requirement since the soap will suspend the polymeric materials in a stable dispersion. Generally an amount of the polymeric materials of this invention sufficient to increase the extreme pressure properties or load-carrying properties of the lubricant will be employed. Proportions, based on the total composition, in the range of about 0.01 to 10.0% by weight are generally useful, particularly concentrations of about 0.1 to 5.0% by weight.

As stated heretofore, the polymers and copolymers of bis-(beta chloroethyl) vinyl phosphonate are effective extreme pressure agents in lubricants. The polymers and copolymers may be employed individually or mixtures thereof may also be employed. However, the preferred lubricant additives of this invention are the copolymers of bis-(beta chloroethyl) vinyl phosphonate and alkenes containing about 2 to 8 carbon atoms, particularly the copolymers with ethylene. Copolymers of ethylene and the phosphonate wherein the mole ratio of ethylene to phosphonate is in the range of about 10:1 to 100:1, preferably about 20:1 to 60:1, have been found to be particularly effective. The use of these copolymers is preferred over the use of the phosphonate polymers as the copolymers are less corrosive than are the polymers. In addition, the alkene-phosphonate copolymers are more soluble in general in lubricants, particularly mineral oil base lubricants, than are the phosphonate polymers.

The lubricating oil base stocks used in the compositions of this invention may be straight mineral lubricating oils or distillates derived from paraffinic, naphthenic, asphaltic or mixed base crudes, or if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced for example by solvent extraction with solvents of the type of phenol, sulfur dioxide, furfural, dichloroethyl ether, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also for special applications various organic esters or animal, vegetable or fish oils or their hydrogenated, polymerized or voltolized products may be employed, either alone or in admixture with mineral oils.

Synthetic lubricating oils having a viscosity of at least 30 SSU at 100° F. may also be used, such as esters of monobasic acids (e.g. ester of $C_8$ Oxo alcohol with $C_8$ Oxo acid, ester of $C_{13}$ Oxo alcohol with octanoic acid, etc.), esters of dibasic acids (e.g. di-2-ethyl hexyl sebacate, di-nonyl adipate, etc.), esters of glycols (e.g. $C_{13}$ Oxo acid diester of tetraethylene glycol, etc.), complex esters (e.g. the complex ester formed by reacting one mol of sebacic acid with two moles of tetraethylene glycol and two moles of 2-ethyl-hexanoic acid, complex ester formed by reacting one mole of tetraethylene glycol with two moles of sebacic acid and two moles of 2-ethyl hexanol, complex ester formed by reacting together one mole of azelaic acid, one mole of tetraethylene glycol, one mole of $C_8$ Oxo alcohol, and one mole of $C_8$ Oxo acid), esters of phosphoric acid (e.g. the ester formed by contacting three moles of the mono methyl ether of ethylene glycol with one mole of phosphorus oxychloride, etc.), halocarbon oils (e.g. the polymer of chlorotrifluoroethylene containing twelve recurring units of chlorotrifluoroethylene), alkyl silicates (e.g. methyl polysiloxanes, ethyl polysiloxanes, methyl-phenyl polysiloxanes, ethyl-phenyl polysiloxanes, etc.) sulfite esters (e.g. ester formed by reacting one mole of sulfur oxychloride with two moles of the methyl ether of ethylene glycol, etc.), carbonates (e.g. the carbonate formed by reacting $C_8$ Oxo alcohol with ethyl carbonate to form a half ester and reacting this half ester with tetraethylene glycol), mercaptals (e.g. the mercaptal formed by reacting 2-ethyl hexyl mercaptan with formaldehyde), formals (e.g. the formal formed by reacting $C_{13}$ Oxo alcohol with formaldehyde), polyglycol type synthetic oils (e.g. the compound formed by condensing butyl alcohol with fourteen units of propylene oxide, etc.), or mixtures of any of the above in any proportions. Mixtures of these synthetic oils and mineral oils may likewise be used.

For best results the base stock chosen should normally be that oil which without the new addition agents present gives satisfactory performance in the service contemplated. However, since one advantage of the agents is that their use also makes feasible the employment of less satisfactory mineral oils or other oils, no strict rule can be laid down for the choice of the base stock. Certain essentials must of course be observed. The oil must possess the viscosity and volatility characteristics known to be required for the service indicated. The oil preferably should be a satisfactory solvent for the addition agent, although in some cases auxiliary solvent agents may be used. Lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of diesel service, particularly with high speed diesel engines, and in aviation engine and other gasoline engine service, oils of higher viscosity index are often preferred, for example, up to 75 to 100, or even higher viscosity index.

In addition to the materials to be added according to the present invention, other agents may also be used in the finished lubricant such as dyes, pour depressors, heat thickened fatty oils, sulfurized fatty oils, organo metallic compounds, metallic or other soaps, sludge dispersers, foam suppressing agents, anti-oxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Specific examples of such other compounds include dibenzyl disulfide, sulfurized sperm oil, voltolized sperm oil, phenyl alpha naphthylamine, polyisobutylene, polymerized lauryl methacrylate, diamyl trisulfide, sulfurized wax olefins, tricresyl phosphate, 2,6-di-tert. butyl-4-methyl phenol, and the reaction product of phenol with sulfur chloride treated diisobutylene. Solvents and assisting agents, such as esters, ketones, alcohols, thioalcohols, amines, aldehydes, halogenated or nitrated compounds, and the like, may also be employed.

The invention will be more fully understood by reference to the following examples. It is pointed out, however, that the examples are given for the purpose of illustration only and are not to be construed as limiting the scope of the present invention in any way.

EXAMPLE I

*Preparation of (a) bis-(beta chloroethyl) vinyl phosphonate polymer and (b) ethylene-bis-(beta chloroethyl) vinyl phosphonate copolymer*

A polymer of bis-(beta chloroethyl) vinyl phosphonate and a copolymer of ethylene and bis-(beta chloroethyl) vinyl phosphonate were prepared simultaneously as follows: A solution composed of 800 cc. of cyclohexane, 75 cc. of bis-(beta chloroethyl) vinyl phosphonate and 15 cc. of di-tertiary butyl peroxide was charged to a 1.8 liter stainless steel bomb. The bomb was closed; ethylene was admitted until the pressure had reached 200 p.s.i., and the bomb was heated to 140° C. At this point the ethylene pressure was raised to 1200 p.s.i. The bomb was rocked in an Aminco apparatus and the temperature and pressure were maintained at the previously described level for 4 hours. At the end of this time the heat was shut off, the bomb cooled, excess ethylene bled off, the bomb opened, and the contents recovered.

The reaction mixture consisted of a mass of semi-solid elastic polymer and a liquid phase. The solid polymer was washed with n-hexane, dissolved in chloroform, and recovered by evaporating all the chloroform. The product weighed 61 gms. and had the following elemental analysis:

Percent chlorine _____ 29.3
Percent phosphorus _____ 12.3

This phase of the reaction product was essentially poly bis-(beta-chloroethyl) vinyl phosphonate.

The liquid phase was distilled to 140° C. at 1 mm. of Hg. The residue weighed 114.8 grams and was a pale yellow grease-like material. This phase analyzed 5.58% chlorine and 2.75% phosphorus and was the reaction product from the vinyl monomer and ethylene. Based upon these data it was calculated that one mole of vinyl phosphonate and thirty-seven moles of ethylene had reacted to form a copolymeric product having an average molecular weight of about 1300.

EXAMPLE II

Both the polymer and the copolymer prepared in Example I were then evaluated as extreme pressure additives in mineral lubricating oils and synthetic lubricating oils. The mineral lubricating oil employed was obtained from a Mid-Continent phenol extracted base stock and had an SSU viscosity at 100° F. of about 465 and a viscosity index of about 110. The synthetic lubricating oil base stock employed was a formal of $C_8$ Oxo alcohol having the following formula:

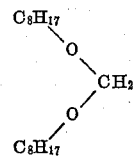

The $C_8$ Oxo formal had an SSU viscosity at 100° F. of about 118.5 and a viscosity index of about 169.

Various combinations of the phosphonate polymer and the ethylene-phosphonate copolymer were evaluated with the aforedescribed mineral oil base stock and synthetic oil base stock in the well-known Almen test. The results noted in the Almen tests are reported in Table I.

TABLE I.—ALMEN EXTREME PRESSURE DATA

|  | Base Stock | Base Stock | Blend I | Blend II | Blend III | Blend IV | Blend V |
|---|---|---|---|---|---|---|---|
| Formulation (Percent Weight): |  |  |  |  |  |  |  |
| PVP [1] |  |  | 2 | 5 |  |  | 2 |
| EVP [2] |  |  |  |  | 2 | 5 |  |
| Mineral Oil | 100 |  | 98 | 95 | 98 | 95 |  |
| $C_8$ Oxo Formal |  | 100 |  |  |  |  | 98 |
|  |  |  | 100 | 100 | 100 | 100 | 100 |
| Almen Tests: |  |  |  |  |  |  |  |
| Gradual Loading— |  |  |  |  |  |  |  |
| Weights Carried | 3 | 4 | 15 | 15 | 15 | 15 | 15 |
| Max. Torque Reading |  |  | 37 | 42 | 49 | 30 | 25 |
| Pin Condition | Sheared | Sheared | Excellent, Smooth, No indication of Wear | | | | |
| Shock Loading— |  |  |  |  |  |  |  |
| Weights Carried |  |  | 12 | 10 | 15 | 15 | 15 |
| Max. Torque Reading |  |  | 40 | 45 | 45 | 43 | 45 |
| Pin Condition |  |  | Excellent, Smooth, No Scratched Surface | | | | |

[1] Poly bis-(beta chloroethyl) vinyl phosphonate.
[2] Ethylene-bis-(beta chloroethyl) vinyl phosphonate copolymer.

It will be noted that the base stocks (both the mineral oil and $C_8$ Oxo formal) failed in the gradual loading portion of the test. However, the addition of about 2 to 5% by weight, based on the total composition, of the polymeric materials of this invention substantially increased the extreme pressure properties of the total composition such that excellent results were obtained in both the gradual loading and shock loading portions of the Almen tests.

EXAMPLE III

Lubricating oil compositions suitable for use as low viscosity-high load carrying turbo-prop lubricants were also prepared containing the copolymer of ethylene and bis-(beta chloroethyl) vinyl phosphonate prepared in Example I. The base stock to which the copolymer was added consisted essentially of 99% by weight of a synthetic lubricating oil, namely, di $C_8$ Oxo azaleate having the following formula

and 1% by weight of phenothiazine as an oxidation inhibitor additive.

The following two specific lubricating oil compositions were prepared and were then evaluated as turbo-prop lubricants:

| Component | Wt. Percent | |
|---|---|---|
| | Composition I | Composition II |
| Base Stock | 99 | 97 |
| Copolymer | 1 | 3 |
| | 100 | 100 |

Included in the tests which were carried out on the above-identified lubricant compositions were the following:

Modified SAE load test

Briefly, this test was carried out as follows: With the SAE lubricant tester set with a gear ratio of 3.4:1 the regular Timken bearing normally used in this tester was run in with the test lubricant for 2 minutes at 50 lbs. (scale set at 5). The load was then manually increased 50 lbs. each 10 seconds thereafter until scuffing occurred. The scuffing load was recorded. Two determinations were deemed sufficient to characterize the test lubricant.

Oxidation corrosion stability test

Briefly, this test was carried out as follows: Five metals (magnesium, iron, aluminum, copper and silver) were heated in 100 ml. of the test lubricant for 72 hours at 347° F. (175° C.). The change in the weight of the metals and in the viscosity and acidity of the test sample were noted and were used to determine the degradation that had occurred. This test is more completely described in MIL-L-7808 Specification.

The following results were obtained in evaluating the two aforedescribed lubricant compositions (Compositions I and II) as turbo-prop lubricants. For comparison purposes, the desired properties of a satisfactory turbo-prop lubricant also are presented.

TABLE II

| | Desired Property | Base Stock+ Ethylene bis-(beta chloroethyl) vinyl phosphonate | |
|---|---|---|---|
| | | 1% | 3% |
| Kin. Viscosity, Cs. @ ° F.: | | | |
| 210 | 3-10 | 3.57 | 3.58 |
| 100 | | 13.18 | 13.71 |
| 35 Min., −65 | 13,000 Max. | 9,342 | 11,653 |
| 3 Hr. 37 Min., −65 | | 9,461 | 11,849 |
| Vis. Stability, Percent Change [1] | 3.0 Max. | 1.3 | 1.6 |
| Flash, ° F | 400 Min. | 440 | 440 |
| Fire, ° F | 450 Min. | 500 | 500 |
| Modified SAE Test Load, lbs. [2] | 700 Min. | 750 | 1,350 |
| 347° F. Ox-Corr. Stability Test: | | | |
| Metal Wt. Change, mgm./cm.[2]— | | | |
| Mg | ±0.2 | +0.03 | +0.07 |
| Fe | ±0.2 | +0.02 | +0.04 |
| Al | ±0.2 | +0.04 | +0.06 |
| Cu | ±0.4 | −0.24 | −0.76 |
| Ag | ±0.2 | +0.09 | +0.17 |
| Vis./100° F., Percent Change | −5 to +15 | +4.6 | +2.9 |

[1] Defined as the percent change in −65° F. viscosity after 3 hours soaking at −65° F.
[2] Base stock alone gave 500 lbs.

It will be noted that each of the two lubricant compositions containing the ethylene-phosphonate copolymers of this invention are excellent turbo-prop lubricants. It will also be noted that the base stock alone failed in the modified SAE load test whereas the base stock plus 1% and 3% copolymer substantially exceeded the minimum requirement of the test.

What is claimed is:

1. A lubricant composition comprising a major proportion of a lubricating oil and about 0.01 to 10.0% by weight, based on the total composition of a polymer having a molecular weight in the range of 1,000 to 3,500 of bis-(beta chloroethyl) vinyl phosphonate.

2. A lubricant composition as defined by claim 1 wherein said lubricating oil is a synthetic oil.

3. A lubricant composition as defined by claim 1 wherein said lubricating oil is a mineral oil.

4. A lubricant composition comprising a major proportion of a lubricating oil and about 0.01 to 10% by weight, based on the total composition of a copolymer having a molecular weight in the range of 500 to 5,000 of bis-(beta chloroethyl) vinyl phosphonate and an alkene containing 2 to 8 carbon atoms, the mole ratio of alkene to phosphonate being in the range of 10:1 to 100:1.

5. A lubricant composition according to claim 4 wherein said alkene is ethylene.

6. A lubricating oil composition comprising a major proportion of a mineral lubricating oil and about 0.1 to 5.0% by weight, based on the total composition, of a polymer of bis-(beta chloroethyl) vinyl phosphonate having a molecular weight in the range of 1,200 to 3,000.

7. A lubricating oil composition comprising a major proportion of a mineral lubricating oil and about 0.1 to 5.0% by weight, based on the total composition of a copolymer having a molecular weight in the range of 600 to 3,000 in which the constituent monomers consist of ethylene and bis-(beta chloroethyl) vinyl phosphonate in the mole ratio of about 10:1 to 100:1.

References Cited in the file of this patent

UNITED STATES PATENTS

| | | |
|---|---|---|
| 2,500,762 | Lieber | Mar. 14, 1950 |
| 2,557,805 | Upson | June 19, 1951 |
| 2,577,796 | Morris | Dec. 11, 1951 |
| 2,659,714 | Harman | Nov. 17, 1953 |
| 2,671,106 | Albisetti | Mar. 2, 1954 |
| 2,694,684 | Rodgers et al. | Nov. 16, 1954 |
| 2,711,403 | Stiles | June 21, 1955 |
| 2,714,100 | Fon Toy et al. | July 26, 1955 |
| 2,824,839 | Templeman | Feb. 25, 1958 |
| 2,901,458 | Banes et al. | Aug. 25, 1959 |